United States Patent

[11] 3,593,295

[72] Inventor Amos E. Joel, Jr.
South Orange, N.J.
[21] Appl. No. 728,157
[22] Filed May 10, 1968
[45] Patented July 13, 1971
[73] Assignee Bell Telephone Laboratories Incorporated
Murray Hill, Berkeley Heights, N.J.

[54] REARRANGEABLE SWITCHING NETWORK
4 Claims, 11 Drawing Figs.

[52] U.S. Cl. .......... 340/166 R, 179/18 GE
[51] Int. Cl. .......... H04m 9/06
[50] Field of Search .......... 179/18.7; 340/166, 147 T; 307/112, 241, 242, 244, 115; 317/137

[56] References Cited

UNITED STATES PATENTS

| | | | |
|---|---|---|---|
| 2,864,008 | 12/1958 | Moore | 307/112 |
| 3,271,523 | 9/1966 | Karrer | 179/18 (.7 Y) |

FOREIGN PATENTS

| | | | |
|---|---|---|---|
| 1,508,191 | 5/1967 | France | 179/18 (.7 Y) |

*Primary Examiner*—Ralph D. Blakeslee
*Attorneys*—R. J. Guenther and James Warren Falk

ABSTRACT: Rearrangeable switching networks are disclosed employing various combinations of two-by-two cross-point switch modules, designated binary modules to signify the restriction on their operating capability to the interconnection of the two input terminals with the two output terminals in a maximum of two electrically conductive configurations, the networks comprising only the two-by-two cross-point binary modules.

PATENTED JUL 13 1971

3,593,295

INVENTOR
A. E. JOEL, JR.
BY R. C. Winter
ATTORNEY

REARRANGEABLE SWITCHING NETWORK

BACKGROUND OF THE INVENTION

A signal switching network, frequently the most vital component in communication systems, may be defined as a black box, a set of input leads, a set of output leads, and a control mechanism. In response to selective settings of the control mechanism, the elements within the black box are manipulated so as to connect particular input leads to corresponding output leads. Considerable effort has been devoted to the refinement of switching networks so as to provide the most efficient and economical arrangement suitable for the particular system requirements.

A familiar type of switching network is the crossbar switch consisting of a number of cross-points at the junctions of horizontal and vertical leads which form the input and output paths of the network. Thus by energizing a particular vertical lead connected to a plurality of such cross-points and a particular horizontal lead also connected to a plurality of cross-points, the single crossbar at the junction of the horizontal and vertical leads will be activated to complete a connection through the network. Such a switching network is two sided and may be arranged in columns called stages, the crossbar switches in each stage being identical. Adjacent stages are connected in a pattern of links or junctors.

Multistage switch networks permit connections between input and output terminals to be rearranged in order to utilize the cross-points efficiently. A rearrangeable network is one in which the permitted states realize every assignment of inputs to outputs, i.e., one in which it is possible to rearrange existing connections so as to complete any new connection. If the network is completely rearrangeable, each input always may be given access to an output through a rearrangement of network connections.

The types of multistage networks now in commercial service are not suitable for use in rearrangeable networks, since the degree of rearrangement which can be achieved is extremely low. However the prior art has shown that completely rearrangeable networks may comprise plural stage, 2×2, crossbar switches connected in link patterns, e.g., see the article by V. E. Benes entitled "Optimal Rearrangeable Multistage Connecting Networks" in The *Bell System Technical Journal*, Vol. 43, July 1964, pages 1641—1656. The cross-point module or array constituting the square switch utilized in such a network may be thought of as being composed of four electromagnetic make contacts which can be activated selectively to interconnect two inputs with two outputs. Of course the maximum of two paths through this simple cross-point module utilizes only two of the four make contacts at any given time. This, then, provides an inefficient use of the 2×2 cross-point module in that, of the sixteen possible states, only two are actually utilized in a rearrangeable switching network.

SUMMARY OF THE INVENTION

Instead of the sixteen state cross-point module utilized in the rearrangeable network of the prior art, in accordance with one aspect of my invention, equivalent arrangements, affording only the two states which such a rearrangeable network can utilize, are achieved by a module comprising two transfer contacts connected in a reversing configuration. Such a two-state or binary module may, for example, consist of two moving contacts and one electromagnet as contrasted with the four moving contacts and four electromagnets employed in the prior art 2×2 cross-point array. By employing such a binary module as the 2×2 cross-point array in a multistage rearrangeable network, a considerable saving in hardware is realized without loss of efficiency. Furthermore, as the network grows in size, the economies realized increase proportionately.

Alternatively, a four-state binary module may be employed wherein two pairs of make contacts are utilized, each pair controlled by an electromagnet. In this binary module four moving contacts but only two electromagnets are employed affording only a theoretical maximum of four states including the two states actually utilized by the network.

In accordance with my invention these binary modules are employed as the cross-points of switching network stages in rearrangeable networks. Thus a rearrangeable switching network, in various illustrative embodiments of my invention, consists of binary module cross-points, each cross-point in turn including only two input and two output leads with contacts for interconnecting the input and output leads and electromagnets for simultaneously energizing all of the contacts or pairs of the contacts, depending on the type of binary module utilized.

The rearrangeable switching networks of my invention thus realize great simplification in the controls and components required because of their realization solely through the use of 2×2 cross-point binary module arrays.

The network arrangement may be further simplified, in accordance with one aspect of this invention, by eliminating one binary module from the input or output stage. Thus a 4×4 network having three stages, with two binary modules per stage, reduces the required network components to five binary modules. This reduction is accomplished without sacrificing any network flexibility in establishing a completely rearrangeable network. The arrangement may be viewed as a one stage selecting tree, including the single binary module, serving the two remaining stages of two binary modules each, the latter stages themselves forming superimposed trees. The arrangement is referred to hereinafter as "nested tries."

The individual binary modules may be thought of as cross-points in a coordinate device. Such a coordinate device may be built which has, in accordance with another aspect of this invention, as many select magnets as rows and as many hold magnets as columns of binary modules. Utilizing this approach a considerable saving in control elements may be realized. Finally, a nonblocking network which eliminates interruptions encountered during rearrangement can be effected by using two rearrangeable networks connected in parallel.

DRAWINGS

FIG. 1 depicts a simple switching network as known in the art;

FIGS. 2A—2E depict various arrangements of binary modules suitable for use in rearrangeable networks in accordance with illustrative embodiments of the invention;

Figure 1:
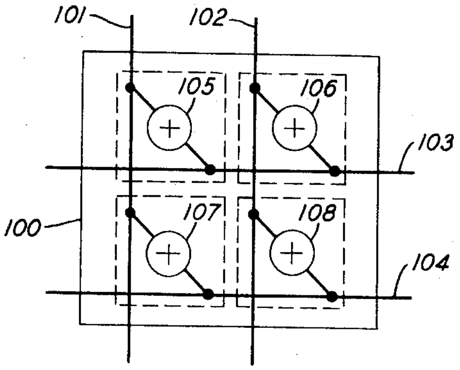

Turning now to FIG. 1 a switching network is depicted comprising the cross-point array or module 100 constituting the black box of the basic switching network, input leads 101 and 102 forming the verticals and output leads 103 and 104 comprising the horizontals for the cross-point module. The cross-points themselves are illustrated as circles 105 through 108. The control for the operational elements contained in each of the circles is not shown. Typically, as noted in FIG. 1, such a network includes electromechanical make contacts as the operational elements at the cross-points, in which case, the control includes a magnet per cross-point to activate the make contacts. Such a cross-point module has 16 possible states in which one or more of the make contacts are actuated simultaneously or none of the make contacts are actuated.

In accordance with various aspects of this invention, a switching network is provided which is rearrangeable so as to permit the connection of an idle input lead to an idle output lead in an otherwise fully occupied network by rearrangement of existing connections through the network. Thus for the purposes of this disclosure, only two of the 16 possible states in the cross-point module of FIG. 1 can be utilized, viz, in the first state, contacts 105 and 108 activated simultaneously will connect input leads 101 and 102 to output leads 103 and 104 respectively, and in the second state, contacts 106 and 107 activated simultaneously will connect input leads 102 and 101 to output leads 103 and 104 respectively.

Figure 2A:
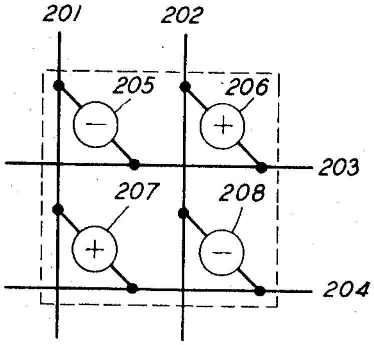
Figure 2B:
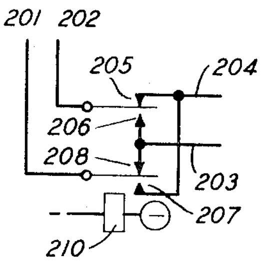
Figure 2C:
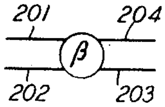

In subsequent illustrative embodiments of rearrangeable switching networks in accordance with my invention an equivalent of the FIG. 1 cross-point module of four make contacts is utilized as noted in FIGS. 2A—2C, by the employment of transfer contacts in a reversing configuration. Thus in FIG. 2A it is seen that cross-points 205 and 208 comprise break contacts while cross-points 206 and 207 comprise make contacts. The equivalent of this circuit is noted in FIG. 2B where it may be appreciated that the single electromagnet 210 satisfies the switching requirements of a 2×2 cross-point module in order to provide the desired reversible switching operation. FIG. 2C illustrates the manner of designating the resultant two-state or binary module $\beta$.

Figures 2D, 2E, 3A, 3B:
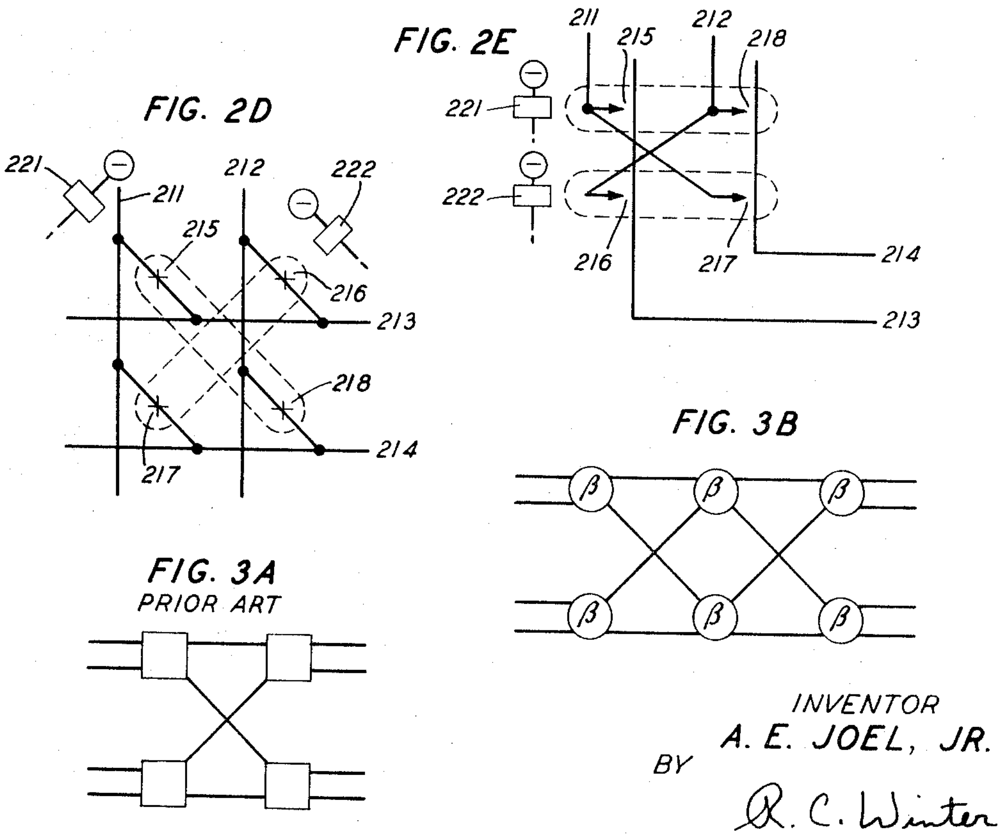
FIG. 2D, FIG. 2E, FIG. 3A PRIOR ART, FIG. 3B
FIG. 3A depicts a 4×4 rearrangeable network as known in the prior art.
FIG. 3B depicts a 4×4 rearrangeable switching network in accordance with an embodiment of my invention.

Although the form of binary module depicted in FIGS. 2A and 2B is preferred, other forms are available to satisfy the requirements of this disclosure. Thus for example as illustrated in FIG. 2D, the binary module may comprise four make contacts 215 through 218 with each pair of diagonally opposite contacts being enabled simultaneously by a corresponding electromagnet, 221 or 222. Such an arrangement, of course, requires one more electromagnet than the arrangement depicted in FIG. 2B. FIG. 2E illustrates the operating arrangement of FIG. 2D.

FIG. 3A depicts a rearrangeable 4×4 network, as known in the art, in which the cross-point modules, depicted as squares, each include four make contacts as shown in FIG. 1. As indicated earlier, the use of four make contacts in the cross-point modules of such a rearrangeable network makes inefficient use of the number of available states. The network depicted in FIG. 3A consists of four input leads and a corresponding number of output leads, each column of modules or stage, in turn, consisting of cross-point modules equivalent in number to one-half the number of inputs. Thus considering that each cross-point module consists of four make contacts and associated electromagnets, the rearrangeable 4×4 network depicted in FIG. 3A requires a total of 16 cross-points and 16 magnets.

In accordance with this illustrative embodiment of my invention, the binary module depicted in FIG. 2C is substituted for the cross-point module of FIG. 1 so as to form the rearrangeable 4×4 network depicted in FIG. 3B. Since the binary module requires a single electromagnet to operate both pairs of transfer contacts in the reversible switch depicted in FIG. 2B, while the cross-point module depicted in FIG. 1 and utilized in FIG. 3A requires four electromagnets to support the same operation, it is evident that an appreciable saving in components may be realized simply by effecting the substitution depicted in FIG. 3B. Thus although the 4×4 rearrangeable network depicted in FIG. 3B consists of one more stage and two more modules than the FIG. 3A network, the six binary modules in FIG. 3B require only six magnets for the 12 cross-points, as contrasted with the 16 cross-points and the 16 magnets required in the network of FIG. 3A.

The contrast between the rearrangeable networks using prior art cross-point arrangements and the binary module cross-points of my invention becomes progressively more dramatic as the network size is increased. For example the prior art, as reflected by the aforementioned V. E. Benes publication, teaches the use of a symmetrical link network to provide an optimal, rearrangeable, multistage, connecting network. Such a network comprises stages of 2×2 modules linked symmetrically about an equivalent middle stage composed of a column of the 4×4 networks depicted in FIG. 3A. The symmetry may be noted in the 17-stage 1024×1024 network depicted in FIG. 4. Thus each stage other than the equivalent middle stage $S_9$ consists of a column of 512, 2×2 modules. Only a few modules are depicted, the missing modules being indicated by dotted lines.

Denoting each of stages $S_1$ through $S_8$ as $k$, the $k$th stage is linked with the ($k$+1)th stage as follows: the first outlet of module 1 in stage $k$ is connected to the first inlet of module 1 in stage ($k$+1); the second outlet of module 1 in stage $k$ is connected to the first inlet of module 2 in stage ($k$+1); the first outlet of module 2 in stage $k$ is connected to the first inlet of module 3 in stage ($k$+1); et cetera. When each module, 1 through 512, in stage ($k$+1) has its first inlet connected, the sequence begins again, this time with the first outlet of module 257 in stage $k$ connected to the second inlet of module 1 in stage ($k$+1). This sequence continues until all links between stages $k$ and ($k$+1) are connected. This pattern is best observed in FIG. 4 by considering stage $S_1$ as $k$ and stage $S_2$ as ($k$+1). The connections for stages $S_9$ through $S_{17}$ are the mirror image of those in stages $S_1$ through $S_8$.

The symmetrical, link-type, rearrangeable network, as known in the prior art, substitutes one of the 4×4 networks depicted in FIG. 3A for each pair of modules in stage $S_9$ to form the equivalent middle stage of 256, 4×4 networks. The resultant multistage network having $N$ inputs, where $N$ is a power of 2 greater than 4, requires $4N(\log_2 N-2)$ cross-points.

Figure 4:
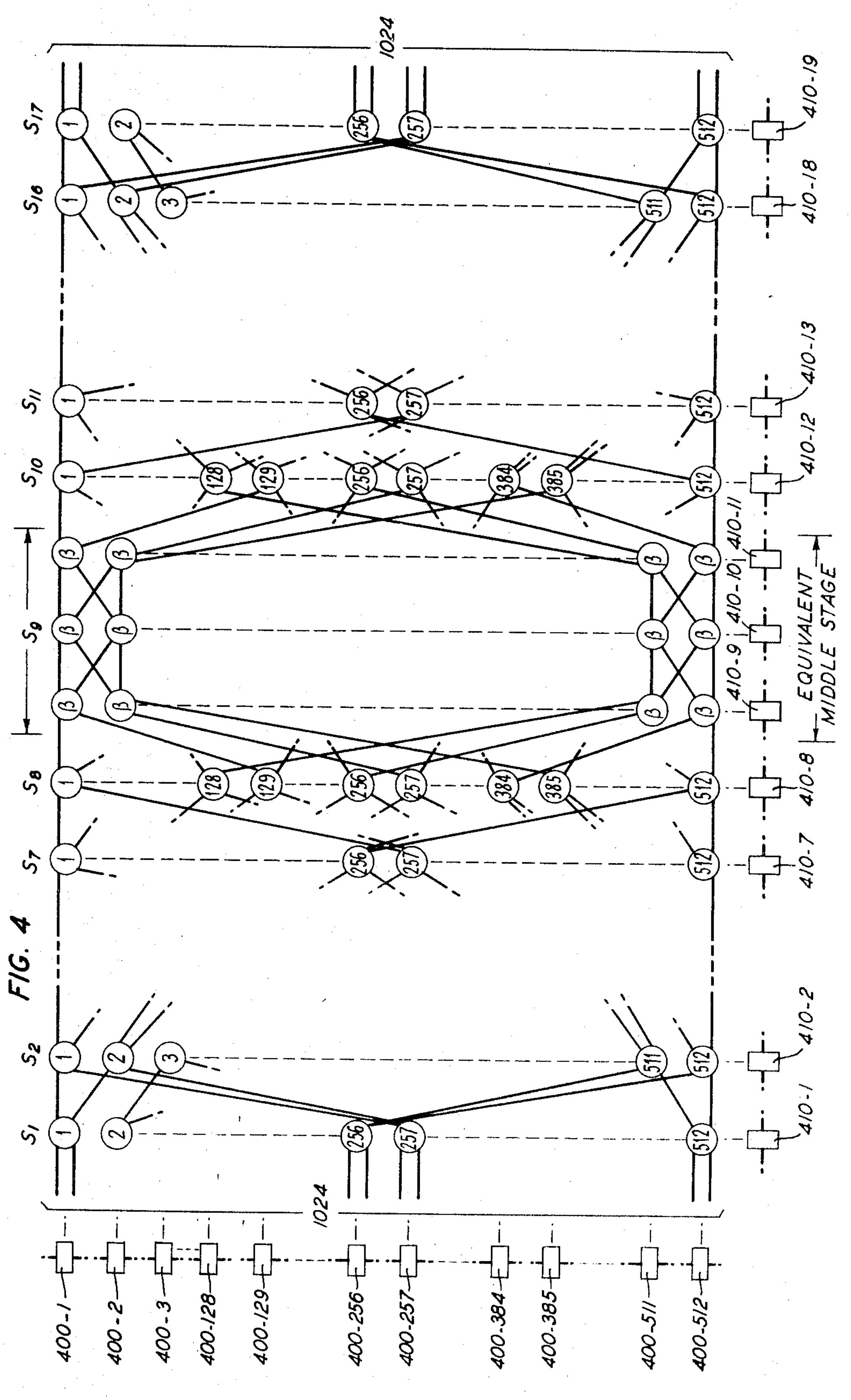
FIG. 4 depicts a 1,024 terminal rearrangeable link network including the network of FIG. 3B as an equivalent middle stage.

In accordance with this embodiment of my invention, the 4×4 network of FIG. 3B is utilized in the equivalent middle stage $S_9$ so as to form the complete, symmetrical, 1024×1024 network as depicted in FIG. 4. By utilizing the equivalent middle stage according to FIG. 3B, instead of FIG. 3A, as illustrated in the network of FIG. 4, a saving of 1024 cross-points and 2560 magnets is realized. If binary modules are used throughout the FIG. 4 network, a total of 9728 magnets and 19,456 cross-points will replace the 32,768 magnets and cross-points required in the prior art arrangement.

A symmetric rearrangeable network in accordance with this illustrative embodiment of the invention, including $N$ inputs and $N$ outputs, will comprise S stages of binary modules with $N/2$ modules per stage where $$S=2\log_2 N-1, \quad (1)$$

and the total binary modules per input is $$\log_2 N-½. \quad (2)$$

Figure 5:
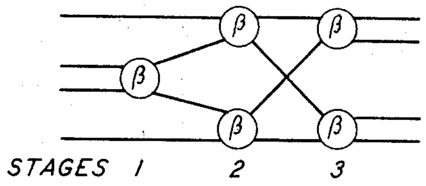
FIG. 5 depicts a "nested trees" type 4×4 network of binary modules in accordance with another embodiment of my invention.

A further reduction in modules required in a rearrangeable switching network is realized in accordance with the "nested trees" configuration depicted in FIG. 5. In accordance with this arrangement, a binary module is eliminated from the first stage of a 4×4 network of binary modules. The two outputs of the remaining binary module in the first stage, each have access to the four network outputs through the superimposed tree arrangement formed by the modules in the remaining stages of the network. Similarly the two inputs which do not terminate on the first stage binary module have access to the four outputs directly through the binary modules in the remaining stages. It is apparent therefore that the desired rearrangeable network requirements are met with one less binary module in a 4×4 "nested trees" network.

Figure 6:
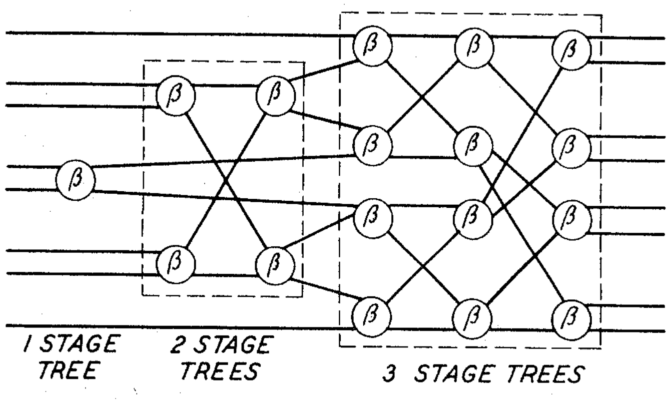
FIG. 6 depicts a network which extends the "nested trees" concept to an 8×8 network.

The concept behind this embodiment of my invention is better illustrated with higher order networks. Thus an 8×8 network, as illustrated in FIG. 6, utilizes seventeen binary modules with one-, two- and three-stage trees occupying a total of six stages in the network. This compares favorably with a single stage, 8×8 switching network; viz, approximately one-quarter of the number of operating magnets, one-half the number of moving contacts, and only four more actual contacts are required.

In general with a "nested trees" network having $N$ inputs, the basic stage or tree group connected with the outputs in fact, comprises $\log_2 N$ internal stages of $N/2$ binary modules and constitutes the highest order tree group. The remaining basic stages, which form lower order tree groups, may be considered as disjunctive nested parts of the network. The total number of binary modules required in such a network arrangement is $$\sum_{s=1}^{\log_2 N} \frac{N}{2^s} \log_2 \frac{N}{2^{s-1}} \qquad (3)$$

which simplifies to $N\log_2 N - N + 1$. (4)

The total number of stages in such "nested trees" networks may be defined as the total number $S$ of internal stages in all tree groups, i.e., $$S = \log_2 N\left(\frac{\log_2 N+1}{2}\right) \qquad (5)$$

For large networks the required number of binary modules per input is $$\log_2 N - 1. \qquad (6)$$

This is a reduction of 0.5 binary modules per input over the symmetric approach described in reference to FIG. 3B. To double the size of a "nested trees" network requires the addition of higher order trees and a doubling of the input capacity of the previous network by converting the former output trees to input trees. This arrangement provides considerably more flexibility when an increase in size is contemplated over that required by a reassignment of links when growth is required in a symmetric-type network.

The binary modules substituted in the link and "nested trees" type networks previously described may be thought of as cross-points in a coordinate device; e.g., the equivalent of a 1024×1024 cross-point network, FIG. 4, contains 512 rows and 19 columns of binary modules. A 512×19 coordinate device could be built as depicted in FIG. 4 utilizing 512 select magnets, 400–1 through 400–512 and 19 hold magnets, 410–1 through 410–19, operated in the manner of a crossbar switch. First the row select magnets 400–1 through 400–512 would be operated in a desired combination to preset the state of each binary module in a particular column, e.g., column $S_1$. Next, the $S_1$ column hold magnet 410–1 would enable the present binary modules in the designated combination. In 19 such steps the entire 1024 symmetrical network could be reconfigured. Crossbar switches with vertical multiples divided in the manner depicted in FIG. 2E could be utilized as the network devices performing in the manner just described. The interstage link wiring in this instance would be provided between verticals.

A specific comparison of this network arrangement of binary modules in a coordinate device with a conventional crossbar network indicates the dramatic improvements that can be realized. Thus a 128×128 "nested trees" network according to expression (6) requires 768 binary modules. A 10-horizontal crossbar switch would include five binary modules per vertical so that sixteen, 10×10 switches would satisfy this size of rearrangeable network. In contrast thirty 10-vertical crossbar switches are required in a three-stage, rearrangeable network of 10×10 switches to provide a 100×100 rearrangeable network of the type depicted in the prior art.

The use of the rearrangement technique in such network configurations may produce objectionable interruptions during each rearrangement period. Such interruptions may be avoided by using two rearrangeable networks connected in parallel which, in turn, results in the equivalent of a completely nonblocking network. For the 128×128 network, only thirty-two 10×10 switches with divided vertical multiples would be required in this configuration.

It is to be understood that the above-described arrangements are illustrative of the application of the principles of the invention. Numerous other arrangements may be devised by those skilled in the art without departing from the spirit and scope of the invention.

Specifically, other devices could be employed in the binary modules or two input-two output cross-points of networks in accordance with my invention. Thus in other embodiments the contacts may be attained through fluid logic devices or semiconductor devices may be utilized, in each case with suitable controls. Accordingly, my invention envisions networks composed of binary modules, as fully described herein, but envisions the possibility of various types of devices and equipments as the modules themselves.

Further, while my invention envisions switching networks composed solely of such binary modules, it is to be understood that stages of conventional networks may be added before or after switching networks in accordance with my invention without departing from my invention.

What I claim is:

1. A rearrangeable switching network having $N$ input terminals and $N$ output terminals, a plurality of binary cross-point modules included in square switches each having two input and two output leads for interconnecting said input and output terminals, said modules being arranged in sections in a nested tree configuration including at least a first section comprising a single stage selecting tree and a second section comprising two-stage superimposed trees, said superimposed trees comprising two modules in the first stage of said second section and two modules in the second stage of said second section, each output lead of each of said first stage modules being connected to an input lead of both of said second stage modules whereby each said first stage module defines a tree configuration with both said second stage modules, certain of said input terminals being directly connected to binary cross-point modules in each of said sections and each of said output terminals being connected to the binary cross-point modules in the last stage of the last section.

2. A rearrangeable switching network in accordance with claim 1 further comprising a third section of said binary cross-point modules, said third section comprising three-stage superimposed trees.

3. A rearrangeable switching network in accordance with claim 2 wherein each of said modules includes make and break contacts for interconnecting said input and output leads and single electromagnetic means for simultaneously energizing all of said contacts.

4. A rearrangeable switching network in accordance with claim 2 wherein each of said modules includes only make contacts for interconnecting said input and output leads and first and second electromagnetic means for simultaneously energizing all of said make contacts.